United States Patent

[11] 3,593,012

| [72] | Inventor | Walter T. Lang<br>Jackson Heights, N.Y. |
|---|---|---|
| [21] | Appl. No. | 791,897 |
| [22] | Filed | Jan. 17, 1969 |
| [45] | Patented | July 13, 1971 |
| [73] | Assignee | Simmonds Precision Products, Inc.<br>Tarrytown, N.Y. |

[54] ENGINE LIFE RECORDER SYSTEM USING ENGINE TEMPERATURE AND RPM DATA
6 Claims, 6 Drawing Figs.

[52] U.S. Cl. .................................................. 235/193,
235/150.51, 235/150.2
[51] Int. Cl. .................................................. G06j 1/00
[50] Field of Search .......................................... 235/150.5,
150.51, 150.52, 150.53, 150.3, 150.31, 150.4,
193, 183, 150.2, 184; 73/116

[56] References Cited
UNITED STATES PATENTS

| 3,237,448 | 3/1966 | Howell et al. .................. | 235/183 |
| 3,250,901 | 5/1966 | Brahm .......................... | 235/183 |
| 3,283,569 | 11/1966 | King et al. ..................... | 235/193 UX |
| 3,357,239 | 12/1967 | Hohenberg ..................... | 235/183 UX |
| 3,362,217 | 1/1968 | Evans et al. .................... | 235/183 X |
| 3,412,241 | 11/1968 | Spence et al. ................... | 235/183 |

Primary Examiner—Malcolm A. Morrison
Assistant Examiner—Joseph F. Ruggiero
Attorney—Edwin E. Greigg ABSTRACT: A recording system for measuring and indicating engine life usage by providing analog data representative of engine temperature and engine r.p.m., summing the analog data and converting the information into serial digital form to analog to the base 2, integrating by counting and displaying the total count as an indication of percent engine life used.

INVENTOR
WALTER T. LANG

FIG. 5

ENGINE LIFE RECORDER SYSTEM USING ENGINE TEMPERATURE AND RPM DATA

This invention relates to a system for recording the life of an engine and, more particularly, to such a system for giving high accuracy indication utilizing microelectronic circuits, the system accepting both engine r.p.m. and engine temperature signals and, in turn, computing and recording the percent of engine life which is being used.

It is the primary object of this invention to provide an engine life recorder utilizing microelectronic circuitry which computes and records the percent of engine life which is being used for a particular engine.

It is another object of this invention to provide an engine life recorder for giving an overspeed and overtemperature indication.

Another object of this invention is to provide an engine life recorder for indicating engine start and engine running time.

It is another object of this invention to provide an engine life recorder for giving r.p.m. output signals as well as temperature output signals.

It is yet another object of this invention to provide an engine life recorder having an adjustment function for adjusting the r.p.m. input parameter, the temperature input parameter and the recording rate for allowing versatile adaptation of the recorder system with different kinds of engines with which the system is employed.

It is still another object of this invention to provide an engine life recorder with a self-test system built therein for checking the system operation from input to output without destroying any of the stored information in the system.

It is still a further object of this invention to provide an engine life recorder system which contains its own power supply and converts a DC primary power to levels compatible with the circuitry in the system.

Yet another object of this invention is to provide a recording system which is highly versatile, having high accuracy and reliability and which has provisions which remove it as a limiting factor in any engine monitoring and maintenance program.

Still another object of the invention is to provide a recording system for recording engine life usage which lends itself to easy expansion or compression of the operating dynamic range of 1,000 percent per hour up to 19,000 percent per hour.

According to one proposed embodiment utilizing the principles of this invention, there is provided a recorder system for recording engine life usage by means of a special purpose computer employing both analog and digital techniques to implement calculations. Engine r.p.m. and engine temperature signals are accepted and combined in the recorder by means of analog circuitry. These combined signals are passed to a log converter and integrator which converts the information to digital circuitry to the antilog to base 2 which permits manipulations utilizing digital techniques. This allows the system to operate over a wide dynamic range to within a 5% accuracy. The digital signal from the log converter and integrator drives a permanent magnetic stepper motor which is geared to a digital counter for indicating percent engine life used. The stepper motor offers storage capabilities and when deenergized, it remains in place and when energized, will advance only when pulsed. When overspeed or overtemperature conditions are detected, appropriate miniature indicator flags are pulsed and magnetically latched. The over speed or overtemperature indication will then remain fixed until externally reset.

An engine start counter is advanced every time the engine temperature exceeds a given value in Fahrenheit degrees. A comparator amplifier in the temperature channel is used to detect this given value condition and thus generates a pulse to advance the counter. At the same time an engine running time indicator is energized and this running time is then recorded.

The r.p.m. and temperature output signals are zero to 5 VDC signals and are supplied externally through low output impedance amplifiers.

The delineation of the rate of life usage (RLU) is logarithmic. This gives a linear characteristic to the effect of speed and provides for a very large dynamic range. Under given temperature and speed conditions, the rate of life usage (RLU) may be expressed as: Log $RLU=f(T_T)+A(\%S)$ where $f(TT)$ is the log RLU applying at 85% r.p.m., $\%S$ is the speed above 85%, and $A$ is the slope of the line representing the function $T_T$. The function of the logarithmic converter is to convert the analog data received as $f(T_T)$ and $A(\%S)$ into RLU, expressing the analog sum in serial digital form and then integrating by counting. The voltage sum is converted into pulse and the higher the voltage, the greater the number of pulses in a given time period. These pulses drive a counter by means of a stepping motor and since the counter accumulates counts at a rate dependent upon the rate of engine life usage, the number displayed on the counter at any given time is the percentage of engine life used up to that time.

GENERAL DESCRIPTION

Figure 1:
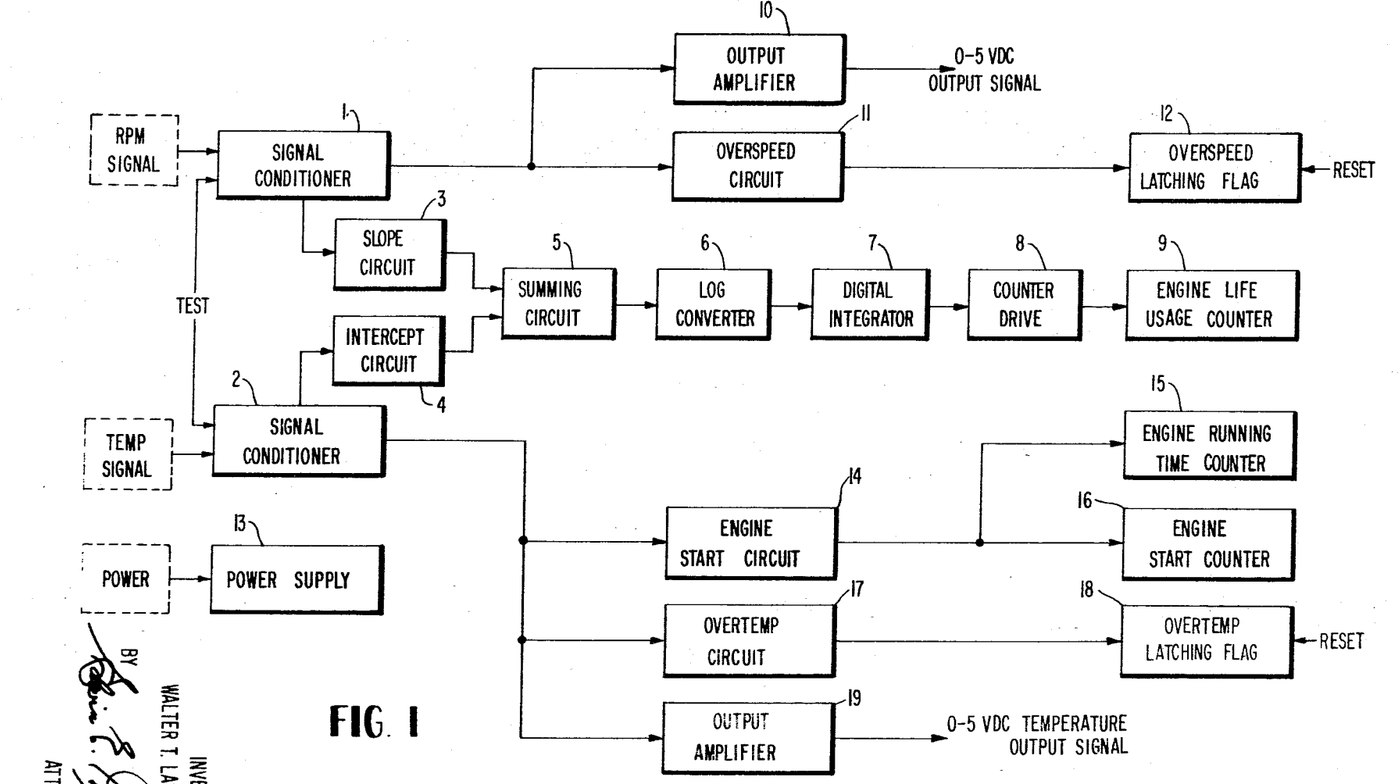
FIG. 1 is a schematic diagram of an engine life recorder system according to this invention.

Referring now to the block diagram shown in FIG. 1 of the overall system according to this invention, it will be seen that an r.p.m. signal derived from appropriate transducer means converted to an engine under test, not shown, is taken through a signal conditioner 1 as a first step in producing a zero to 5 VDC r.p.m output signal. The conditioner 1 converts varying frequency signals to proportional DC signals. Since the input signal frequency is directly proportional to r.p.m., no additional linearization is necessary, and since the output from the signal conditioner is at a low level, the signal is taken through an output amplifier 10 which raises its level appropriately and acts as a buffer providing the desired output impedance.

The r.p.m. signal conditioner 1 output is also fed to an overspeed circuit 11, namely, a DC analog voltage limit detector which gates out a signal whenever the signal conditioner output is at or above a preadjusted level. When gated out, the overspeed circuit 11 drives a latching flag 12 to its warning position. The flag stays latched in its warning position after the signal drops below the warning level and even after the recorder power is removed, since it is latched in place. An externally accessible reset button may be provided to release the flag to its unlatched position.

As will be explained below, the signal conditioner also supplies the signal for driving an engine life usage counter 9.

The input signal from a temperature sensing device, such as a pyrometer or the like, not shown, is fed through a second signal conditioner 2 as a first step in producing a zero to 5 volt DC temperature output signal. The signal conditioner 2 is a DC converter with a built-in function generator, the latter serving as a linearizer since the EMF of the input signal is not linearly related to temperature. The conditioner 2 is provided with a lead circuit and, in addition, uses the thermistor signal from the temperature sensor to correct for the ambient temperature of the pyrometer, to be more fully explained below.

The signal conditioner output at a relatively low level is taken through an output amplifier 19 for providing the desired output level and impedance. The temperature signal conditioner output is taken through an overtemperature circuit 17, for example, a limit detector, to an overtemperature latching flag mechanism 18 to provide the overtemperature flag display. This function is identical to that described for the overspeed flag 12 above. The DC output from the signal conditioner 2 is also taken through another limit detector and into the engine start circuit 14. The preadjusted DC level of this circuit corresponds to the equivalent of 600° F. at the temperature sensor. Whenever engine temperature exceeds this point, the start circuit gates out a signal to the engine time counter 15 and to the engine start counter 16, as shown. The latter adds one count to its display whenever the engine temperature rises through 600° F. The time counter is turned on and stays on until the temperature falls below 600° F, or recorder power is removed, recording engine running life cumulatively.

The two signal conditioners 1 and 2 are disconnected from the input signals when a test switch is actuated, connecting them in turn to preset simulated signals. At the same time, the output displays are locked into their previous count. The two DC output signal from amplifiers 10 and 19 will indicate the preset simulated values and a mechanical rotating target, not shown, will show that the recorder is operating. Releasing the test switch restores the recorder to normal operation.

The two signal conditioners 1 and 2 also provide the signals which, through a process involving analog and digital computations (blocks 3—9) cause the engine life usage counter 9 to display the appropriate percent life used. Briefly, the analog signals from the signal conditioners 1 and 2 are summed, giving an analog signal related to the instantaneous rate of engine life being used. This signal is passed through a digital log converter 6 with a very wide dynamic range. The converter 6 produces a pulse train whose total pulse count is proportional to the antilog of the analog instantaneous rate usage signal. This variable count pulse train is repeated almost 1,000 times a second (although slower sampling rates can be used) and fed to a digital integrator 7. The total number of counts accumulated is directly proportional to the percent engine life used. The integrator 7 supplies pulses at a much reduced rate, but still proportional to the counter drive 8 which, in turn, actuates the display counter 9. The counter 9 constantly advances when the engine is operating and accumulates a count indicating percentage engine life used.

Figure 2:
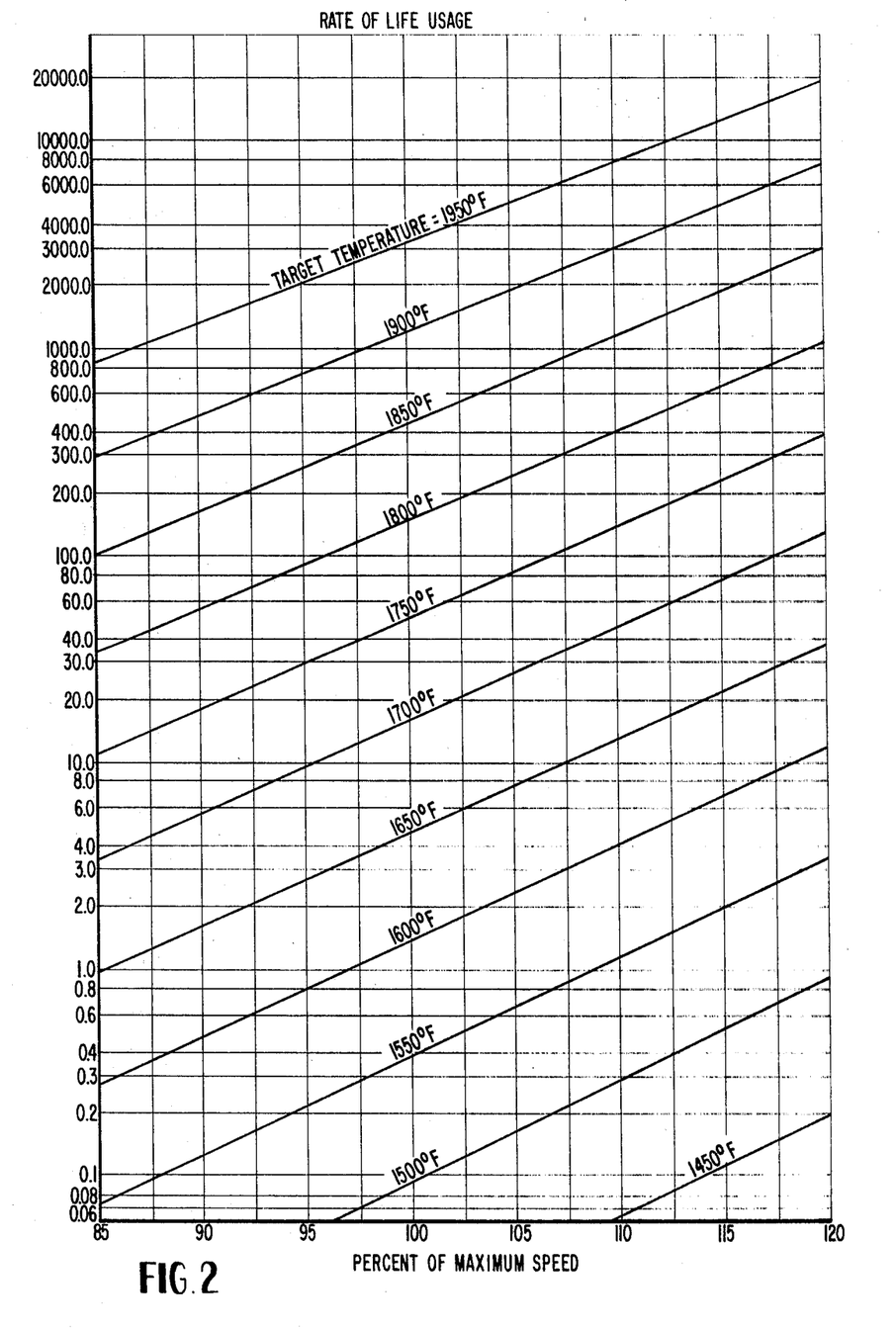
FIG. 2 is a graph showing the rate of life usage in percent per hour to the variables, temperature and percent of maximum speed.

Referring now to FIG. 2, there is shown a graph of the rate of life usage (RLU) which relates the variables, target temperature ($T_T$) and percent of maximum speed (%r.p.m.) to the rate of life in percent per hour. The curves labeled target temperature $T_T$ are each straight lines, or at least appear to be since they do not deviate from a straight line by more than the line width. The assumption that the curves $T_T$ are straight lines as depicted on a semilog graph permits the computation to be implemented by the slope-intercept equation $y=mx+b$. The log of rate of life usage (log RLU) is then the linear function $y$. The slope of a particular $T_T$ line is $m$, and $x$ is $S$, the speed above 85% r.p.m. ($S$=r.p.m.−85) and $b$ is the intercept of that $T_T$ line expressed in the same manner as $y$. For a given typical graphed line of $T_T$, then:

$$\log RLU = A(\%S) + f(T_T)$$

Figures 2A, 4:
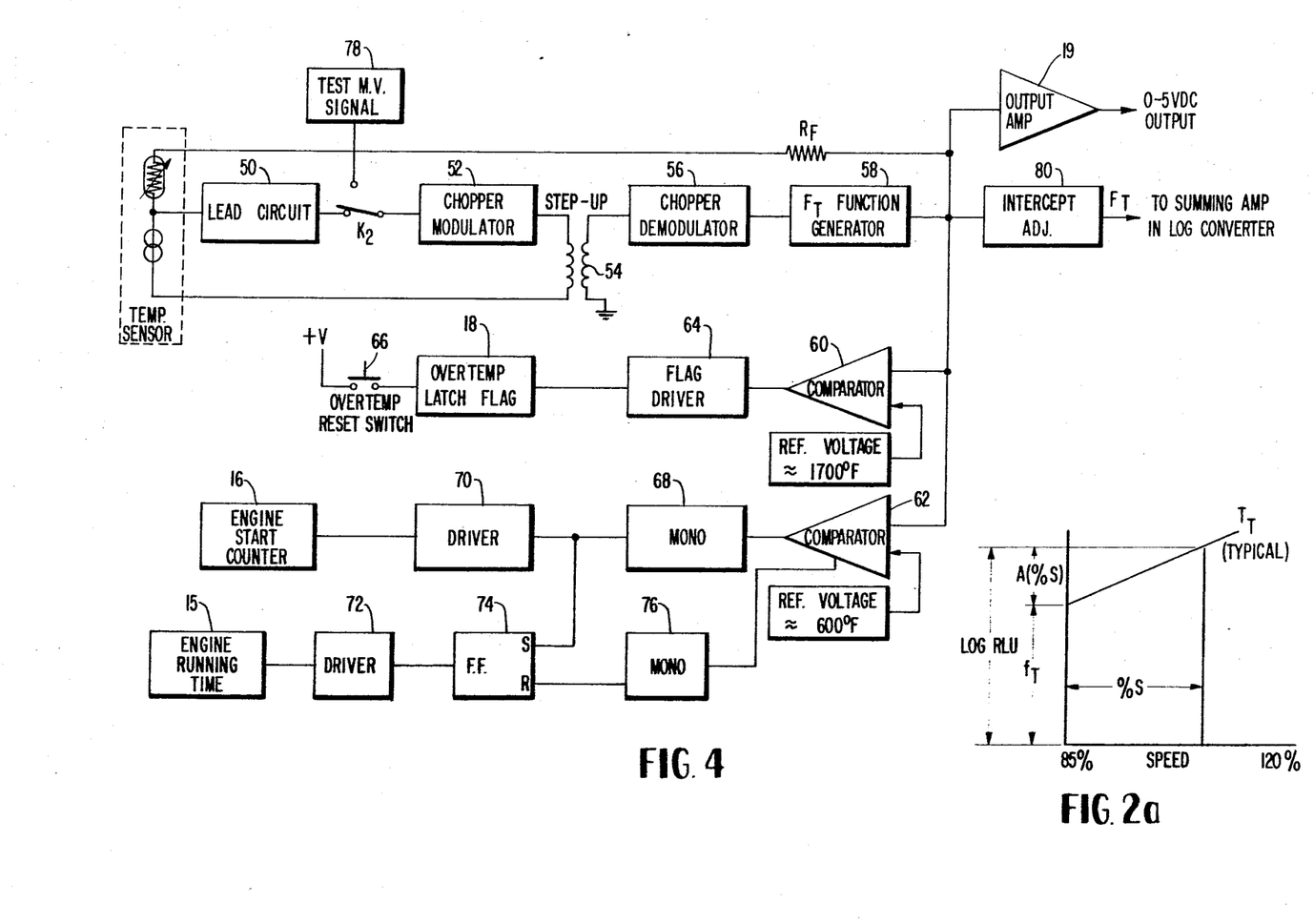
FIG. 2a is a graph showing the computation of a slope-intercept equation $y=mx+b$ for a given temperature line shown in FIG. 2.
FIG. 4 is a schematic diagram of the temperature channel of the recorder system.

This is shown in FIG. 2a.

On this basis, the following approach can be taken. A voltage proportional to $T_T$ can be added to another voltage proportional to %S, the latter having first been multiplied by a value proportional to slope. The voltage sum is then linearly related to log RLU. If the signal is then passed through a log converter, the output will be the appropriate rate signal. Integrating and displaying the signal would then provide the desired output. This approach requires only that the slope and intercept values be known, and they can be determined solely by knowing the values of $T_T$ and %S.

Using graphical methods, the slopes of the $T_T$ lines have been found to vary over a range of 10% with lower temperatures generally having higher slopes. The slopes are almost identical within region A, shown in FIG. 2a. It is possible, then, to implement a mathematical expression in which the slope would be a variable, a function of temperature. For example:

$$\log RLU = (f_2)(T_T)(\%S) + f_1(T_T)$$

It will be seen that $f_2(T_T)$ decreases for increasing values of $T$ T. A reciprocal function can be obtained by using the circuitry of a regulated power supply whose output is controlled in a feedback network using the difference between $T_T$ and a reference voltage. $T_T$ would first be reshaped appropriately with a function generator. The shaping of the function generator to produce the function $f_2$ would be different from that of the function $f_1$, and the function $f_2$ must be continuous. Although the graph of FIG. 2 shows lines of 50° F. intervals, the recorder must be able to compute the RLU for any value of temperature (or r.p.m. within the stated limits. It is desirable that a fixed value of slope be used so that a slope can be selected to introduce the minimum error for all values relating to region A, as shown in FIG. 2a. It is possible, then, to select slightly different intercepts for some of the graphed lines, so that the fixed slope technique would introduce only a minor error.

The intervals between intercepts of the $T_T$ lines on the 85% r.p.m. axis are not uniform on a linear scale. Inspection of the variation in the length of the intervals does not disclose a simple formula that could be used to implement the relationship. Here, again, the equation must be continuous for all required values of $T_T$. A fixed value for the intervals between intercepts would introduce error. However, the implementation of a variable value is not difficult since the point of intercept constantly increases as the value of $T_T$ increases. Accepting that the lines are parallel, then the temperature appears in the equation only once, that is, Log RLU=$A(\%S)+f(T_T)$. The temperature signal is an EMF signal, nonlinear with respect to temperature, and it too constantly increases with $T_T$. Since the EMF would have to be passed through a function generator to be linearized, it can just as well be converted to the somewhat nonlinear function that defines the intercepts.

As will be seen from FIG. 2, the lines for 1450° F. and 1500° F. do not intersect 85% r.p.m. Estimates can be made for these values which are necessary to compute any intersections of r.p.m. and temperature occuring in the lower right-hand corner of region A. Possible combinations of r.p.m. and temperature intersecting to the left of or below region A (see FIG. 2a) could result in the generation of voltages equivalent to measurable values of RLU. Since these values are not to be recorded, the circuitry will provide recording cutoff signals when RLU drops to some level below 0.06% per hour or when the r.p.m. drops below 85%.

It is possible that the graph shown in FIG. 2 may change so long as the general form is adhered to. Thus changes in the recording rate uniformly throughout the range would involve a vertical scale shift. Changes can be made with respect to the intervals between intercepts. This is a scale factor change and is accomplished by adjusting the output of the temperature channel with respect to its input. Further changes in the slope of the lines may be effected by adjusting the output of the r.p.m. channel with respect to its input. In addition, it is possible to change the slope as a function of temperature.

R.P.M. CHANNEL

Figure 3:
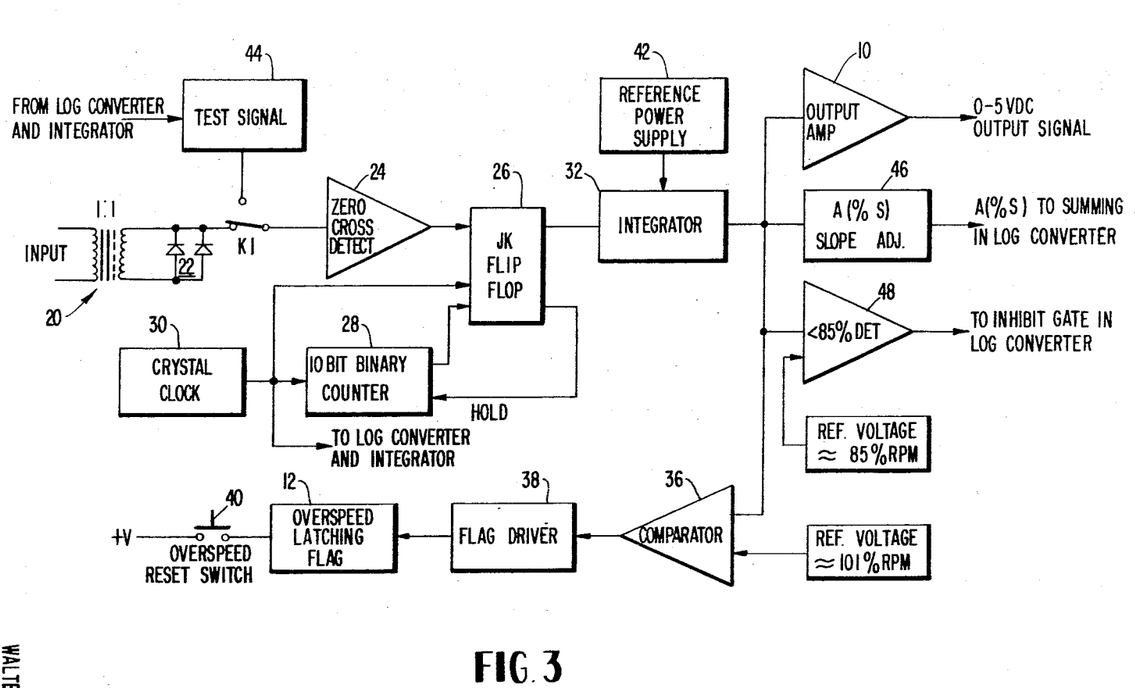
FIG. 3 is a schematic diagram of the r.p.m. channel of the recorder system.
Figure 5:
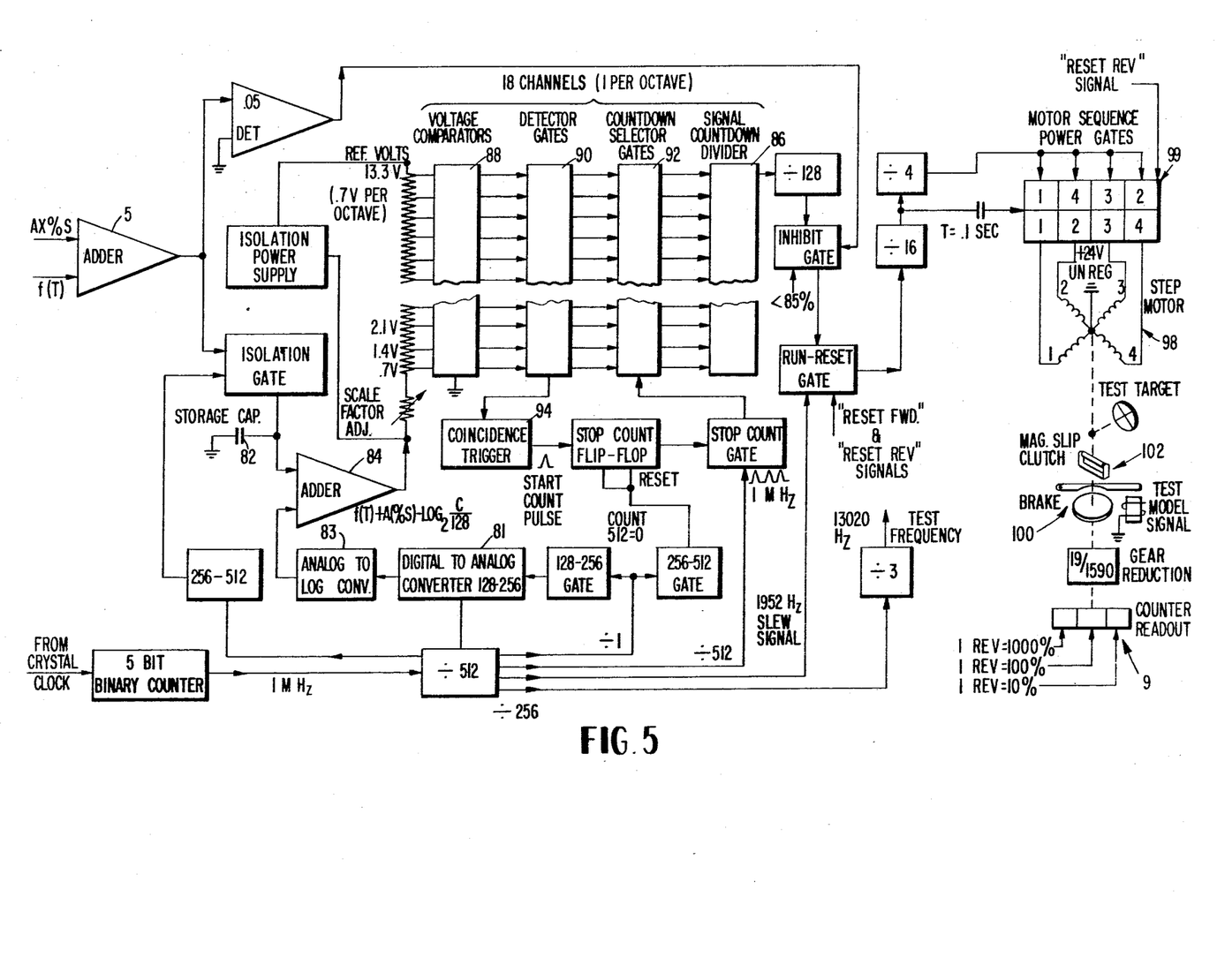
FIG. 5 is a schematic diagram of the logarithmic converter and integrator circuit.

FIGS. 3—5 refer to the detailed description of the circuitry shown in FIG. 1. The r.p.m. channel as shown in FIG. 3 converts varying frequency signals into proportional DC signals as previously explained. The technique used is the generation of a fixed width pulse which is repeated at a rate proportional to the input frequency and then integrated to develop the DC voltage. The r.p.m. channel also contains circuitry for sensing and displaying the overspeed condition as above referred to, developing a DC voltage proportional to r.p.m. which is to be used externally, and detecting when r.p.m. falls below 85% to inhibit a gate to a stepper motor in the log converter and integrator circuit.

As shown, the input signal is coupled by transformer 20 to ensure the required isolation. Clipping diodes 22 are provided for protecting the zero-cross detector 24 for the signal amplitude range of 0.75 volts to 10 volts peak to peak. The zero-cross detector 24 accepts the varying frequency, varying amplitude signal (i.e. the r.p.m. signal) and converts it to a fixed amplitude varying frequency signal which is compatible with the microelectronic logic circuits to be discussed below. This signal is then converted to a DC voltage proportional to it in the manner indicated below.

The JK flip-flop 26 produces the fixed amplitude, fixed, that is, with width pulse which is repeated at a rate proportional to input frequency. The JK flip-flop 26 is normally held in the 0 state because of the logical combination on the J and K inputs of the signals from the zero-cross detector 24 and binary counter circuit 28. The crystal-controlled clock 30 is free running but has no effect on the binary counter 28 since it is held in a DC preset by the JK flip-flop 26. When a zero-cross is detected the logical combination changes on the J and K inputs. The clock pulse following this causes the flip-flop 26 to change state. This, in turn, releases the binary counter 28 and the countup begins. The flip-flop 26 will remain in the new state until the counter 28 reaches its full count and the control line from the counter causes the logical combination on the J and K inputs to change. The clock pulse following this will cause the JK flip-flop 26 to reset to its original state completing the pulse to the integrator 32 and inhibiting the counter until the next zero-cross detection occurs, at which time the cycle is repeated. These fixed width, fixed amplitude pulses from the JK flip-flop 26 are then integrated, generating a DC level. Using this technique the pulse width will always be within ±1 clock pulse. The clock rate selected gives a resolution of 0.1% for the pulse width.

In addition to converting the frequency to voltage for use within the engine life recorder, the r.p.m. channel also develops a 0—5 VDC signal for use outside the device. This is done by feeding the output from the integrator 32 to an output amplifier 10 (see FIG. 1). The amplifier 10 will not load the integrator 32 and will present a low output impedance for any external equipment which might be used.

The overspeed indication is accomplished by monitoring the DC output of the integrator 32 with a comparator amplifier 36. When the DC signal voltage is equivalent to 101.2% ±0.2%, as shown, the comparator output will switch, pulsing the overspeed flag 12 through the flag driver mechanism 38. The flag will continue to indicate that an overspeed condition has occurred until externally reset by the application of a reset pulse from an overspeed reset switch 40.

The integrator 32 is powered by a precision variable power supply 42 which can be used to correct the various slopes of the curves represented in FIG. 2 with the addition of a slope detection circuit 46. When a new slope requirement is detected, the amplitude of the pulse is varied accordingly to effect the change. This range of adjustment will allow a ⅓:3 variation of the slopes on the curve depicted. Further, an 85% detector 48 will sense the output of the integrator 32. Thus, if the voltage output represents less than 85% speed, the detector 48 will generate an inhibit signal stopping any information to the stepper in the log converter circuit 6 (see FIG. 1). This ensures engine life usage recording for the conditions represented by the graph shown in FIG. 2.

The K1 relay shown in FIG. 3 is the test relay. Thus, when the test mode is selected, K1 switches the input of the zero-cross detector 24 to the test signal 44. The test frequency is preselected to a value which will give a known r.p.m. indication.

TEMPERATURE CHANNEL

Referring now to FIG. 4, there is shown a detailed schematic of the temperature channel which conditions the low-level temperature signals into signals compatible with the engine life recorder. This channel also senses and displays the over temperature condition, develops a DC voltage proportional to temperature which is to be used externally, and senses and records the engine start condition by means of the engine start circuit 14 to initiate the engine running time indicator 15.

To ensure isolation the temperature channel will also be transformer coupled, as described above with respect to the r.p.m. channel.

This is achieved by having the low-level DC signal from the solar cell lead circuit 50 modulated by a solid-state chopper 52, then transformer coupled by means of transformer 54 and demodulated back to DC by a second solid-state chopper 56. The signal is then applied to a function generator 58 to develop the function of temperature ($F_T$) to be used in the computation for percent of engine life usage.

As shown, the temperature channel also includes two comparators 60, 62, one to detect the 1700° signal and one to detect the 600° signal, as shown. When the signal reaches 1700°±17°, the comparator 60 activates the overtemperature magnetic latching indicator flag 18 by means of the flag driver mechanism 64. The flag 18 will stay set until externally reset by the overtemperature reset switch 66. Comparator 62 detects the 600° signal and, in turn, initiates the mono 68 to advance the engine start counter 16 by means of the driver mechanism 70. The mono 68 also energizes the engine running time recorder 15 by means of the driver mechanism 72 through the SR flip-flop 74, the latter having its S input connected to the mono 68 and its R input connected to a mono 76.

The signal $f(T_T)$, which is nearly linear, is the signal which in turn will be transmitted externally through the low output impedance amplifier 19 (see FIG. 1). This signal will be a 0—5 VDC signal proportional to the input temperature and to be used with external equipment if so desired.

When self-test is initiated, relay K2 will switch in a known millivolt signal 78 allowing checkout of the complete temperature channel and of the entire system in conjunction with the r.p.m. test signal 44. The temperature channel may also include an input parameter adjustment circuit 80. This adjustment will affect the interval between the intercept of each of the temperature lines $T_T$ on the curves shown in FIG. 2. The adjustment will allow a range of ⅓:3 according to the curves shown in FIG. 2.

LOGARITHMIC CONVERTER AND INTEGRATOR

As shown in FIG. 5, a detailed schematic of the log converter and integrator circuit is depicted. The function of the logarithmic converter is to convert the analog data received as an $f(T_T)$ and $A(\%S)$ into rate life usage (RLU), expressing the analog sum in serial digital form and then integrating by counting.

The voltage sum is converted into pulse, the higher the voltage, the greater the number of pulses in a given time period. These pulses are used to drive a counter by means of a stepping motor 98. Since the counter accumulates counts at a rate dependent upon the rate of engine life usage, the number displayed on the counter at any given time is the percentage of engine life used up to that time.

In the log converter and integrator circuit shown in FIG. 5, use is made of 2 as the logarithmic base. This adapts directly to the binary system of counting, readily performed by bistable flip-flops. It also simplifies the synthesizing of a log function since the mantissa of a logarithm over an octave has a much more nearly linear relation to the quantity than is true over a decade.

The following scale distribution illustrates this phenomenon:

| RLU (percent/hr.) | Octave |
|---|---|
| 26214.4 | −19 |
| 13107.2 | −18 |
| 6553.6 | −17 |
| 3276.8 | −16 |
| 1638.4 | −15 |
| 819.2 | −14 |
| 409.6 | −13 |
| 204.8 | −12 |
| 102.4 | −11 |
| 51.2 | −10 |
| 25.6 | −9 |
| 12.8 | −8 |
| 6.4 | −7 |
| 3.2 | −6 |
| 1.6 | −5 |
| .8 | −4 |
| .4 | −3 |
| .2 | −2 |
| .1 | −1 |
| .05 | −0 |

←19,000 percent/hr. (max. RLU).

←.06 percent/hr. (min. RLU).
←Ref. RLU = .05 percent/hr.

Like common logarithms, logarithms to base 2 have a characteristic which is integral and a mantissa which is less than 1. The characteristic indicates the order of octave number N of the next lower octave and the mantissa is the log of the ratio of the number to that value. This ratio obviously always lies between 1 and 2 and its logarithm lies between 0 and 1. Thus, in the scale illustrated above for RLU=0.5, which falls in the 0.4 to 0.8 octave, the characteristic would be 3 and the mantissa would be log 2(0.5/0.4) or 0.3219. According to the computer of this invention, the mantissa and characteristic are handled separately, as will be seen with reference to FIG. 5 in which is shown a block diagram of the log converter and integrator circuit.

As shown in FIG. 5, incoming analog voltage signals of $f(T_T)$ and $A(\%S)$ to proper scale are combined at the adder 5 (see FIG. 1) and stored in the storage capacitor 82. During the computing cycle, the incoming signal line is disconnected so that any change in level will not interfere with the scanning process. A 1 MHz, clock pulse provides the time base for the measuring system, as shown. Countdown binaries and gates are provided, as shown, so that a 256-microsecond measurement cycle is initiated every 512 microseconds. Thus nearly 2000 determinations are made every second. During the period when measurement is not being made, the storage capacitor is connected to the signal source. Additional countdown binaries are provided, as shown, to give testing and calibration frequencies and for slewing the step motor 98.

The measurement cycle has two portions, each 128 microseconds long. The first half produces a pulse count from the converter 81 that is proportional to the lower end of the octave in which the RLU lies. The second half produces a pulse count proportional to the point at which RLU is above the lower end of the octave. For example,

| RLU | Octave | Pulses | Pulse total |
|---|---|---|---|
| 3.2 | −6 | 320 | |
| 1.6 | −5 | 160 | |
| .8 | −4 | 80 | |
| .5 | 3¼ | 40 | .25(40) = 50 |
| .4 | −3 | 40 | |
| .2 | −2 | 20 | |

The first two columns, with the exception of the numbers enclosed in the block are taken from the scale distribution by octaves listed above. The value of 0.5 RLU is one assumed for explanatory purposes.

The analog voltages from the analog to log converter 83 are summed at the adder 84 and will be proportional to the linear progression indicated by the column headed "Octave." A voltage proportional to 3¼ would correspond to an RLU of 0.5 and should produce a pulse count total of 50. In the first portion of the measurement cycle the converter 81, 83 (see 6 in FIG. 1) would determine that the voltage proportional to log RLU lay between the top and bottom of the third octave. Consequently, in that first portion (128 microseconds long) 40 pulses would issue from the converter 6 to the digital in-tegrator 7 (see FIG. 1), but would stop when the pulse count was indicative of the distance above the bottom of the octave occupied by the RLU. In the illustration, one-quarter above the bottom of the octave would give one-quarter of the pulses associated with the bottom of the octave. The total pulse count 50 is then directly proportional to the RLU.

According to the principles of this invention, a unique technique is used to produce a pulse rate proportional to the RLU. The clock signal can be fed into a signal countdown divider 86 at any one of 19 different levels. The clock signal is then divided down by a number depending on the level at which it is inserted. For example, at the start of the first portion of the measurement cycle, the analog-to-log converter 83 has no output so that the signal proceeds without change through the second adder 84 to the voltage comparator 88 which has a series of equally spaced voltage reference steps, as shown, each corresponding to one octave on the RLU scale as above described. A coincidence detector 90 at each step occupies one state when the signal is less than the corresponding value and another state when it is more. A series of such detector gates then detects the one zone (i.e. octave) where a transition of states of the coincidence detector occurs. The particular detector gate so actuated operates a corresponding countdown selector gate 92 from a corresponding group of such countdown selector gates which then switches the serial pulse signal into the proper injection point in the signal countdown divider 86 to thereby provide the frequency division ratio for that octave. The division ratio which is frequency, out, divided by frequency, in, is $2^{(N+19)}$ where N is the order of the octave involved. The same detector gate 90 also switches in a coincidence trigger module 94 which emits a pulse when the signal reaches a value equal to that of the lower boundary of the octave.

At the start of the second portion of a measurement cycle, an analog staircase voltage is generated which is proportional to the count above 128 and continues to count 256. This is applied to a characterization network so that an output voltage of $\log_2(C/128)$ results, as shown in FIG. 5. Symbol C denotes the number of counts elapsed since the beginning of the staircase voltage and the quantity $(C/128)$ always lies between 1 and 2. Therefore, the $\log_2$ thereof goes only from 0 to 1 and characterization is relatively simple. As shown in FIG. 5, this voltage is applied subtractively to the incoming signal summation at adder 84. Since the voltage scale factor is the same for all items, voltage across the voltage comparator 88 is:

$$N - \left[ f(T_T) + A(\%S) \log_2 \frac{C}{128} \right]$$

The above decreases in value as count continues. Each count simultaneously enters the countdown binary input until the above expression attains a zero value, at which time it is gated off by the coincidence trigger 94. Then, $$N - [f(T_T) + A(\%S)] \log_2 \frac{C}{128} = 0$$

Transposing and substituting $\log_2 2^N = N$ and $128 = 2^7$ $$f(T_T) + A(\%S) = \log_2(C \times 2^{N-7})$$

and since 0.05 is the RLU reference axis:

$\text{RLU}/0.05 = \text{antilog } [f(T_T) + A(\%S)] = C \times 2^{N-7}$ The above process is repeated every 512 counts of the clock pulse generator. The average frequency $F_{in}$ entering the countdown binary is then:

$$F_{in} = \frac{C}{\frac{1}{f} \times 512}$$

Substituting the value of $C$ thus obtained in the preceding relation and remembering that $512 = 2^9$, we obtain:

$$\frac{RLU}{.05} = F_{in} \times \frac{2^{N+2}}{f}$$

Selection of the entry point into the countdown binary as previously described is such that the output frequency $F_{out}$ is:

$$F_{in}/2^{18+N}$$

Then, $$\frac{RLU}{.05} = F_{out} \times \frac{2^{20}}{f}$$

For the maximum value of RLU (19,000%/Hr.), $F_{out}$ is 362.4 KH which is beyond the range of step motors. It is counted down by 2¹¹ to 176.9 H, which allows operation of the step motor 98 well up on its torque-speed characteristic. Its speed will be 2654 r.p.m. at this maximum rate. Motor 98 requires that the pulses be applied to its four terminals in cyclic order and this is accomplished by the motor sequence gates 99. The length of pulse duration is very long at low values of RLU, and a timing network limits the motor pulses to approximately 0.1 second, thus conserving power. The step motor being of the permanent magnet type retains its position even when no power is being applied. Since the motor speed is proportional to %RLU, the angular travel of its shaft is proportional to the time integral thereof or the percentage of life used. The motor drives the mechanical counter 9 as shown at a suitable gear ratio for direct readout of percentage life used. A register on the counter is provided for indications above 100% life since otherwise, should 100% be inadvertently exceeded, a much smaller and erroneous reading would be obtained.

For test purposes, a brake 100 is arranged to hold the counter stationary during the test so that data previously accumulated is not destroyed. A magnetic slip clutch 102 with no sliding parts permits the step motor to rotate under the controlled test conditions imposed. A rotary target 104 is coupled to the motor and enables motor performance to be checked with the counter stationary. For resetting the counter 9, slewing gates are provided to which signals from an external source may be applied to drive the mechanical counter in either direction. To prevent long term drift of the counter, a gate is arranged to completely deenergize the motor for inputs to the log converter 6 of less than 0.05%/Hr. RLU.

It is also contemplated that double octaves may be used rather than the single octaves as above described. For this purpose the scale division boundaries will occur at $4^N$ points instead of $2^N$ points and the logarithmic function entering the adder 84 will then be $2 \log_4(C/128)$ instead of $\log_2(C/128)$. The resulting scale distribution will now show six zones instead of 12 for the relaxed (0.06% to 100%) RLU range, or 10 instead of 19 for that originally required (0.06% to 19,000%). For example:

| RLU (Percent/hr.) | N | |
|---|---|---|
| 52428.8 | 10 | |
| 13107.2 | 9 | 19,000 percent/hr. (max. RLU in orig. spec.) |
| 3276.8 | 8 | |
| 819.2 | 7 | |
| 204.8 | 6 | 100 percent/hr. (max. RLU in relaxed spec.) |
| 51.2 | 5 | |
| 12.8 | 4 | |
| 3.2 | 3 | |
| .2 | 1 | .06 percent/hr. (min. RLU) |
| .05 | —0 | Ref. RLU = .05 percent/hr. |

The foregoing arrangement results in an economy saving by eliminating 50% of the voltage comparators 88, detector gates 90 and countdown selector gates 92. The number of counts for each counting interval will range from 128 to 512 instead of 128 to 256 and the counting interval is increased from 512 to 1,024 microseconds. This has no material effect on the output accuracy, as nearly 1000 determinations are still made each second. The highly advantageous feature of counting down by binaries is still retained, and while the number of binaries remains the same, the associated circuitry is somewhat simplified, since injection points in the counting train now occur at every other binary instead of at each binary. The above savings are made at the expense of a substantial increase in the dynamic range of the log converting function. This is divided into two portions: the digital-to-analog converter 81 (see FIG. 5) which is tripled in range since it now goes from 128 to 512 instead of 128 to 256 and the analog-to-log converter 83 whose range is extended. The function of a single octave, as above described, could be synthesized adequately by 2 linear segments, that is, at least two more linear segments will now be required for the $\log_4$ synthesization.

It is contemplated that $8^N$ intervals may be used instead of $4^N$. However, the increased complexity of the log converting function would offset any gain from the accompanying reduction in the number of selector channels. Use of common logarithms (for example, $\log_{10}$) has been considered and would certainly contribute toward simplification of the system according to this invention, since common logarithms are much more in general use. The inherent simplicity, however, of binary chain division dictates the use of 2, or a power thereof, if the number of components is to be minimized. It should also be understood that logarithms of a given number to any base are linearly related to each other.

That which I claim is:

1. In an engine life recorder system, the combination comprising, a first and second signal conditioner means for receiving respectively an r.p.m. signal input and a temperature signal input, a summing circuit for receiving the respective outputs of said first and second signal conditioner means for providing an analog signal related to the instantaneous rate of engine life being used, said analog signal being fed to a digital log converter for converting said analog signal to a pulse train having a total pulse count proportional to the antilog of said analog instantaneous rate usage signal, a digital integrator circuit for receiving the variable count pulse train from said digital log converter means for supplying pulses at a reduced rate, a counter drive means for receiving said pulses from said integrator circuit, and a display counter connected to said counter drive means for accumulating a count indicating percentage engine life used.

2. In an engine life recorder system, the combination comprising, a first and second signal conditioner means for receiving respectively an r.p.m. signal input and a temperature signal input, a summing circuit for receiving the outputs of said first and second signal conditioner means and having means for providing an analog signal related to the instantaneous rate of engine life being used, said analog signal being fed to a digital log converter and integrator circuit for converting said analog signal to a pulse train having a total pulse count proportional to the antilog of said analog instantaneous rate usage signal, and counter means connected to said pulse train for indicating percentage engine life used.

3. In an engine life recorder system according to claim 2, wherein the log of said analog instantaneous rate usage signal is to the base 2.

4. In an engine life recorder system according to claim 2, wherein the log of said analog instantaneous rate usage signal is to the base 4.

5. In a recording system for engine life usage, the combination comprising, a first and second signal conditioner means for receiving respectively an r.p.m. signal input and a temperature signal input, a summing circuit for receiving the outputs of said first and second signal conditioner means for providing an analog signal related to the instantaneous rate of engine life being used, said analog signal being fed to a digital log converter for converting said analog signal to a variable count pulse train, a digital integrator means for receiving said pulse train for supplying pulses at a reduced rate, a counter drive means for receiving said pulses from said integrator means, and a display counter connected to said counter drive means for accumulating a count indicating percentage of engine life used.

6. A method for recording engine life usage comprising the steps of: providing signals responsive to temperature and r.p.m. of an engine, summing said signals to provide an analog signal related to the instantaneous rate of engine life being used, converting said signal into a serial digital form having a total pulse count proportional to the antilog of said analog instantaneous rate usage signal, and integrating said serial pulse train by counting, whereby the total number of counts accumulated is directly proportional to percent engine life used.